May 24, 1966   C. C. PACKARD   3,253,213
MEANS FOR EVALUATING CONTACT NOISE UTILIZING PULSE
COINCIDENCE TECHNIQUES
Filed Dec. 31, 1959   5 Sheets-Sheet 1

INVENTOR.
C. C. PACKARD

BY
Seughrue Rothwell Mion & Zinn
ATTORNEYS

United States Patent Office 3,253,213
Patented May 24, 1966

1

3,253,213
MEANS FOR EVALUATING CONTACT NOISE UTILIZING PULSE COINCIDENCE TECHNIQUES
Charles C. Packard, Endicott, N.Y., assignor to International Business Machines Corporation, New York, N.Y., a corporation of New York
Filed Dec. 31, 1959, Ser. No. 863,306
2 Claims. (Cl. 324—28)

The present invention relates to apparatus for evaluating contact noise in make and break devices, and more particularly, to means for varying the interrogation time and duration for a brush output from analog-to-digital encoder after a transistion has occurred from a nonconducting segment to a conducting segment.

A typical analog-to-digital brush converter or encoder utilizes a coded disc sensed with stationary brushes to transform analog shaft position information into digital electrical signals. Such a coded disc is usually constructed of several concentric tracks, each of which consists of alternate conducting and nonconducting segments. Each track has associated therewith a brush. At any given shaft position, a brush contacts either a conducting or a nonconducting segment, which provides an ON or an OFF signal level, respectively, from the brush. The number of ON and OFF levels at the read positions defines the shaft angle in accordance with the particular binary code employed.

Encoder failure occurs almost exclusively in the form of incorrect readout signals caused by brush contact noise when a brush is making contact with a conducting segment. Two distinct classifications of noise are present. These are momentary opens caused by brush bounce or particles of nonconducting impurities which accumulate on the conducting segment, and fluctuations in contact resistance of the conducting segment caused by irregularities in the surface or variations in contact pressure. The presence of either of these types of noise may cause an erroneous output signal from the brush, in that an OFF signal level may be indicated even though a conducting segment is beneath the brush. Thermal, thermo-electric, and electrostatic noises are also present, but these noises are not of sufficient magnitude to be considered significant.

Encoder reliability and life span are determined by the extent of brush noise and by certain interrogation parameters. Factors influencing the extent of brush noise include brush pressure, input shaft speed, frequency of brush transitions between segments, and frequency of rotation reversal. Significant interrogation parameters include interrogation pulse width, magnitude of driving voltage and current, and sensitivity of readout equipment. In addition to examining the above quantities, the spatial distribution of noise over a segment must be examined because certain readout techniques avoid interrogation near transition regions.

The present invention is not limited to shaft encoder testing. It may be used directly to investigate the contact noise characteristics of such components as relays, switches, emitters, commutators, or other devices whenever a periodic make and break can be instrumented. With only slight modification of external input equipment, the duration of relay or brush-commutator contact opens during nonperiodic operations may also be measured.

An object of the invention therefore is to provide apparatus for analyzing a step signal function having first and second levels, which includes first means responsive to said first level of said step signal function for generating an interrogating signal, and second means responsive to said first level together with said interrogating signal for producing an output signal.

2

Another object of the present invention is to provide apparatus for determining the location and magnitude of noise generated when a brush contacts a conducting segment on the encoder disc which might otherwise present a successful interrogation of this conducting segment and so give an erroneous indication as to the position of the shaft.

A yet further object of the invention is to provide apparatus in which the initiation of the interrogating signal for a brush is delayed for a certain length of time after the transition has been made from a nonconducting segment to a conducting segment.

Another object of the present invention is to provide means for varying the duration of the interrogating signal which samples the brush readout.

Another object of the invention is to provide a first counting means for counting the number of successful interrogations, represented on ON signal levels, and another counting means for counting the number of total interrogations, so that the accumulative count within the first and second counters represents a ratio of the reliability of the source of step voltage function.

Other objects and features of the invention will be pointed out in the following description which is to be taken with the accompanying drawings, in which:

Figure 1:
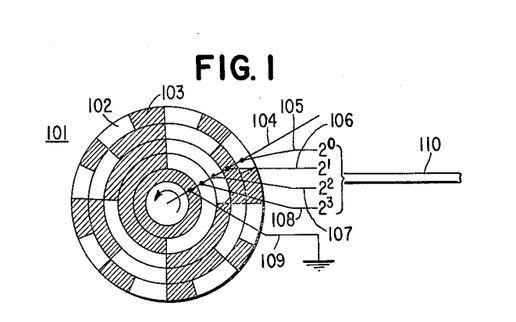
FIGURE 1 shows a typical analog-to-digital encoder disc and its brushes utilizing a pure binary readout.

Referring first to FIGURE 1, there is shown a typical coded disc which may be used in an analog-to-digital brush encoder having a pure binary output. Disc 101 has thereon a plurality of concentric circular tracks, with each track composed of conducting segments 103 denoted by shaded portions and nonconducting segments 102 denoted by light portions. In the pure binary system, the outermost of the concentric tracks will contain twice as many conducting and nonconducting segments as does the next adjacent track. This ratio continues as progress is made toward the center of the disc. Associated with the concentric tracks are a plurality of readout brushes 105, 106, 107, and 108, there being one brush for each track. These brushes may be arranged on a common read line 104, or they may be staggered on different radii of the disc. A common brush 109 is associated with the innermost concentric track which is completely conducting, and it is connected to a ground return path. Since all of the conducting segments 103 on the disc make contact, either directly or indirectly with this innermost grounded track, then these segments are also at ground potential. Each brush reads a different concentric circle, so it is seen that brush 105 indicates the value of the $2^0$ binary bit of the binary number representing the analog position of the shaft. Brush 106 indicates the $2^1$ binary bit of this number, and so forth. If a brush contacts a conducting segment, then it is approximately at ground potential and thus indicates that its bit has a "1" value. For convenience sake, the readout lines from these four brushes are tied together in a cable 110 which is connected to the brush selection network 205 shown in FIGURE 2, along with the cables from the other converters which are also on the motor shaft.

Figure 2:
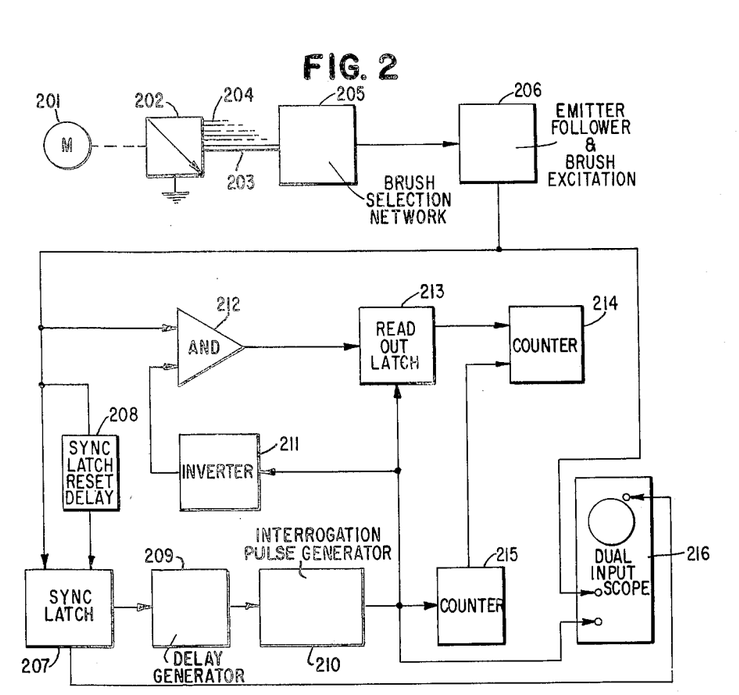
FIGURE 2 shows a block diagram of the invention.

Turning now to FIGURE 2, a plurality of converters under investigation are mounted in a test fixture 202 where they are driven in common by a variable speed direct current motor 201. The motor field current may be applied through a timing circuit, not shown, that provides a periodic reversal of rotation so that interrogations can be conducted with the coded disc revolving in opposite directions. Each converter has a plurality of brushes associated therewith, as more particularly shown in FIGURE 1, and the particular converter and a particular brush thereon to be tested is selected by a switching network 205, the details of which are not shown. Cable 203 represents the brush outputs from one converter. Brush excitation circuit 206 provides substantially a two-level ON and OFF step signal function output, depending upon whether the brush under test is contacting a nonconducting segment or a conducting segment on its associated coded disc. Upon the brush making a transition from a nonconducting segment to a conducting segment, the output signal from unit 206 will change from an OFF level magnitude to an ON level magnitude and remain at said ON level, except for the presence of brush noise, until the brush again makes contact with a nonconducting segment. Upon the brush making a transition from a nonconducting segment to a conducting segment, a sync latch 207 will be set to an ON condition by the ON level from 206, and upon the brush making a transition from the conducting segment back to a nonconducting segment, the sync latch will be reset to an OFF condition by reset delay 208 which receives the OFF level output signal from unit 206. When latch circuit 207 is initially set to its ON condition, a signal is applied to delay generator 209 which will subsequently, with a variable time delay, produce a pulse applied to interrogation pulse generator 210. Upon receipt of this pulse from delay generator 209, interrogation pulse generator 210 generates an interrogation signal whose duration is varied according to the requirements of the test. This interrogation signal is applied through inverter 211 to one input of AND circuit 212. The other input of AND circuit 212 is derived from the output of unit 206. An output from AND circuit 212 is obtained whenever there is present at its inputs the interrogation signal together with the ON level signal from unit 206. If the output of AND circuit 212 is present for a certain minimum duration, this causes readout latch 213 to be set to an ON condition. The readout latch 213 is reset to an OFF condition upon the termination of the interrogation signal from generator 210.

Connected to the output of readout latch 213 is a first counter 214 which is actuated in response to latch 213 being set to its ON condition. Also connected to the output of pulse generator 210 is a second counter 215 which is actuated in response to the interrogation signal. Each counter is incremented by a count of 1 at the time that its associated input signal initially appears. Counter 215 therefore records the total number of interrogation signals which are generated during the time that the brush is tested, while counter 214 records the number of successful interrogations of the brush as determined by the presence of an ON signal level from unit 206 sometime during the interrogation. Counter 215 may be used to turn counter 214 on and off at some convenient reference such as 1,000 or 10,000 counts, thus providing a direct reading of percent successful interrogations at counter 214. The converter output from unit 206 and the interrogation signal from generator 210 may be monitored simultaneously on a dual input oscilloscope 216 to facilitate setting up the desired interrogation signal width and delay. Scope 216 is synchronized from sync latch 207 which provides a common reference.

The range of delay provided by delay generator 209, and the range of interrogation signal width provided by pulse generator 210, must be sufficiently large to allow any portion of a conducting segment to be sampled over a reasonable spread of noise conditions. In the present embodiment, signal width may be varied from 1 to 10,000 microseconds and delayed up to 4 seconds from the time that a brush crosses a transition point.

Figure 3:
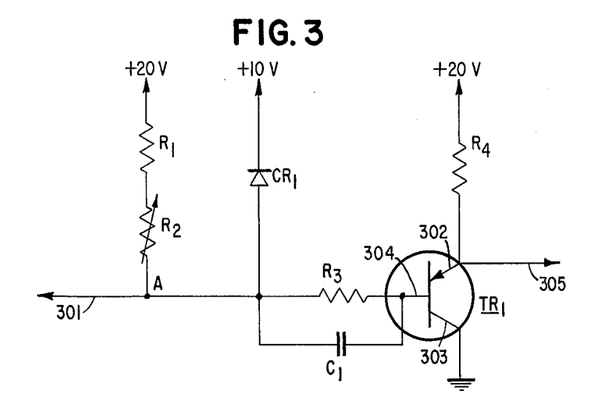
FIGURE 3 shows the brush excitation and isolation amplifier.

Turning now to FIGURE 3, there is shown the circuit of the brush excitation and isolation amplifier 206 of FIGURE 2. Lead 301 may be selectively coupled to any one of the brushes on any one of the converters by means of brush selection network 205. $TR_1$ is a P-N-P transistor used as an emitter follower amplifier having emitter 302, base 304, and collector 303. Base current limiting resistor $R_3$ is connected to lead 301 with a speed-up capacitor $C_1$ connected in parallel therewith. Emitter load resistor $R_4$ is connected to a +20 volt potential, while fixed resistor $R_1$ and variable resistor $R_2$ are connected in series and connected between the lead 301 and the +20 volt potential which provides brush excitation current. Diode $CR_1$ clamps lead 301 to a maximum potential of +10 volts. Output lead 305 is taken from emitter 302 and connected to lead 401 in FIGURE 4, subsequently to be described.

Figure 7:
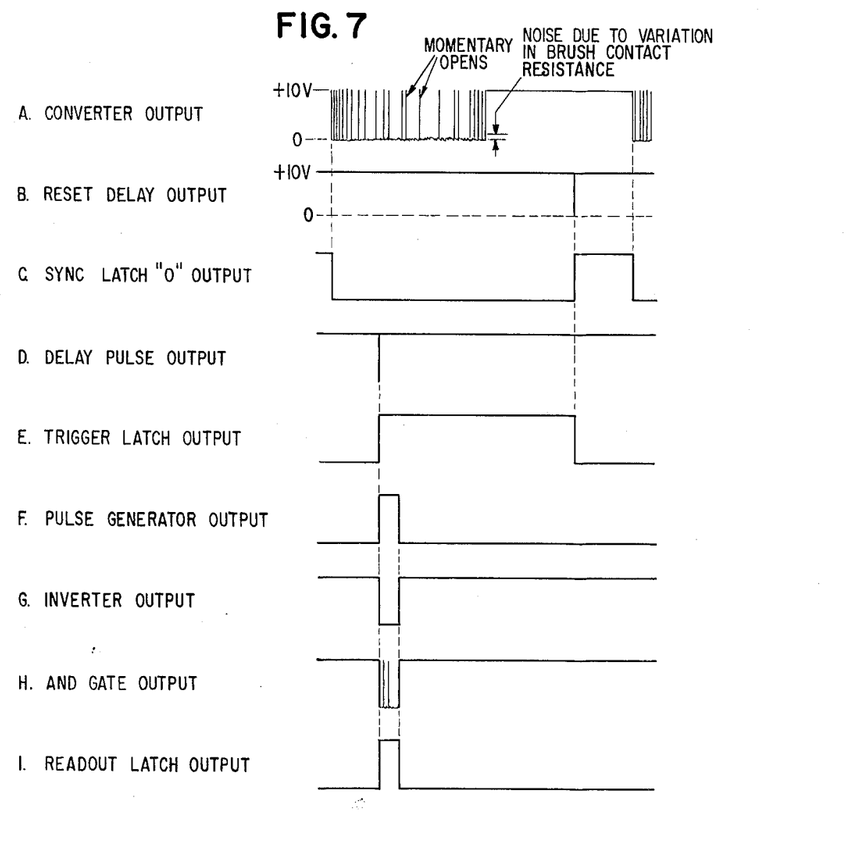
FIGURE 7 shows typical wave forms generated within the circuit of the invention.

The operation of FIGURE 3 will now be described with particular reference to the waveforms of FIGURE 7, wherein the identifying letter associated with each signal corresponds to the point at which the signal is observed. When the converter brush being tested is contacting a nonconducting segment on the coded disc, then an open circuit exists between conductor 301 and the common ground return path. With the +20 volt potential applied to the series combination of resistors $R_1$ and $R_2$, the potential at point A is limited to a maximum of 10 volts due to the presence of diode $CR_1$. Due to the small value of resistor $R_3$, the potential of base 304 of transistor $TR_1$ is but slightly above this 10 volt potential. Therefore, inasmuch as $TR_1$ is a P-N-P transistor, it will be in a conducting state since base 304 is lower in potential than emitter 302 which is connected through resistor $R_4$ to +20 volts. The potential of emitter 302 at this time for all practical purposes may be considered to be approximately 10 volts, or slightly above the potential of base 304. This potential represents the OFF level of the brush.

When a transition is made by the brush so as to contact a conducting segment on the coded disc, then point A falls to essentially ground potential due to the completion of the circuit. Brush current at this time may be varied from one to ten milliamps by adjustment of $R_2$. Upon the reduction of potential at point A, a negative spike is transferred across the speedup capacitor $C_1$ so as to quickly reduce the potential at base 304 of transistor $TR_1$. Consequently, more current flows from the emitter to the collector and the potential of emitter 304 is reduced accordingly so as to approach ground potential. This low potential from emitter 304 represents the ON level of the brush. Thus, the output of amplifier $TR_1$ will essentially follow the potential of the brush to which lead 301 is connected. In an ideal converter, the potential at point A would be maintained at ground potential level when the brush is in contact with a conducting segment. However, as before noted, the brush may bounce or there may be opens in the conducting segment which would momentarily cause the potential at point A to climb to +10 volts. Furthermore, the contact resistance of the conducting segment may vary as the brush traverses its length so that "grass" noise appears at point A. These different types of noise are shown in FIGURE 7. The potential at emitter 302 also reflects this noise by increasing. Upon the brush again making a transition from a conducting segment to a nonconducting segment, the potential at point A will rise to +10 volts. Normally, nonconducting segments are noise free with negligible exception, so that this +10 volt potential is uninterrupted.

Figure 4:
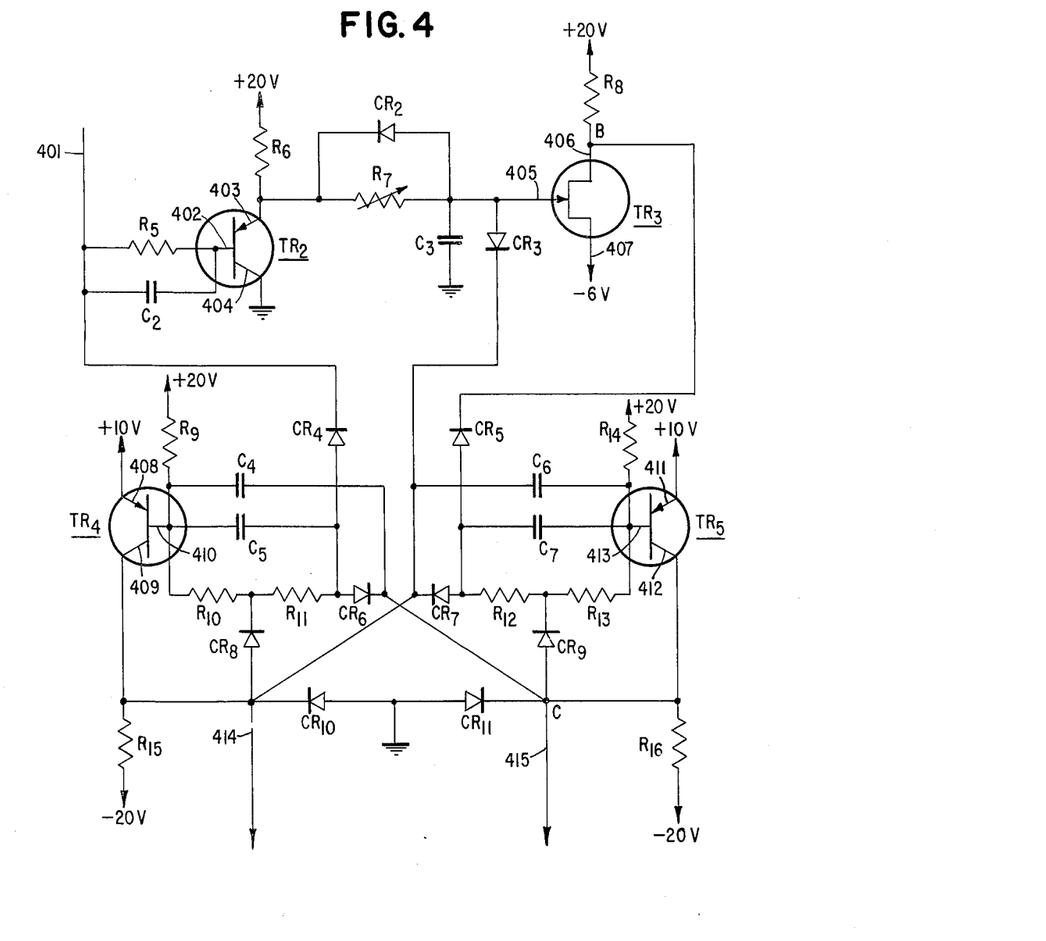
FIGURE 4 shows the sync latch and reset generator.

Referring now to FIGURE 4, the sync latch and reset delay circuits will be described. These circuits are represented by blocks 207 and 208, respectively, in FIGURE 2. P-N-P transistors $TR_4$ and $TR_5$ are cross coupled so as to form the bistable sync latch having an ON condition and an OFF condition. The sync latch is in its OFF condition during the time that the brush contacts a nonconducting segment, which is defined by the fact that transistor $TR_5$ is conducting while transistor $TR_4$ is not conducting. Conversely, the sync latch is triggered to its ON condition when the brush makes a transition from a nonconducting segment to a conducting segment and remains in this ON condition until the brush returns to a nonconducting segment. The ON condition is indicated by transistor $TR_4$ conducting while transistor $TR_5$ is not conducting. The latch is triggered to its ON condition by a drop in potential appearing on input lead 401 which is taken from emitter 302 of transistor $TR_1$ in FIGURE 3, while the latch is triggered to its OFF condition by a drop in potential appearing on base 406 of transistor $TR_3$ in the reset generator of FIGURE 4.

In the sync latch, a voltage divider circuit consisting of resistors $R_{14}$, $R_{13}$, $R_{12}$, and diode $CR_7$ is connected between the +20 volt terminal and collector 409 of transistor $TR_4$. Base 413 of transistor $TR_5$ is connected between resistors $R_{14}$ and $R_{13}$ of this voltage divider. In like fashion, a voltage divider consisting of resistors $R_9$, $R_{10}$, $R_{11}$, and diode $CR_6$ is connected across the +20 volt terminal and collector 412 of transistor $TR_5$. Base 410 of transistor $TR_4$ is connected between resistors $R_9$ and $R_{10}$ of this second voltage divider. Collectors 412 and 409 are connected to —20 volt terminals through respective load resistors $R_{16}$ and $R_{15}$. Furthermore, diodes $CR_{11}$ and $CR_{10}$ clamp collectors 412 and 409 respectively, so that their potential cannot drop below ground. Diodes $CR_9$ and $CR_8$ which are connected between the collectors and the voltage dividers, limit the collector current of their associated transistors when in the conducting state.

Capacitors $C_4$ and $C_5$ are connected so as to speed up the turning on and turning off of transistor $TR_4$. Capacitors $C_6$ and $C_7$ are similarly used to speed up the turning on and turning off of transistor $TR_5$. Diode $CR_4$ is connected to base 410 transistor $TR_4$ through capacitor $C_5$, and is poled so as to transmit a drop in potential on input 401 which sets the sync latch to its ON condition. In like fashion, diode $CR_5$ is connected through capacitor $C_7$ to the base 413 of transistor $TR_5$ and is poled so as to allow a drop in potential at point B (at the base 406 of transistor $TR_3$) to reset the sync latch to its OFF condition. Output lead 415 from collector 412 is directed to the delay generator 209 of FIGURES 2 and 5, while output lead 414 from collector 409 may be directed to the sync input of the oscilloscope 216 shown in FIGURE 2.

The circuit consisting of transistors $TR_2$ and $TR_3$ provides a reset delay for the sync latch which causes the latch to be reset to its OFF condition a certain time after the brush makes a transition from a conducting segment to a nonconducting segment. The input from FIGURE 3 applied to lead 401 is directed to base 402 of transistor $TR_2$ through current limiting resistor $R_5$ and speedup capacitor $C_2$. Emitter 403 is connected through load resistor $R_6$ to the +20 volt terminal, while collector 404 is grounded. $TR_2$ is therefore an emitter follower. The output from emitter 403 is directed to an R-C circuit consisting of variable resistor $R_7$ and capacitor $C_3$. Transistor $TR_3$ is a silicon unijunction transistor whose emitter 405 is connected to the junction between $R_7$ and $C_3$. Its operation is similar to that of a thyratron. When the potential across capacitor $C_3$ reaches a critical positive potential, $TR_3$ fires and capacitor $C_3$ discharges through emitter 405 to base 407. This action is accompanied by a current flow from base 406 to base 407 which results in a drop of potential at base 406. Diode $CR_3$ is connected between base 405 of transistor $TR_3$ and collector 409 of transistor $TR_4$ in the sync latch. Its function is to prevent continuous firing of transistor $TR_3$ after the sync latch has once been reset to its OFF condition. Diode $CR_2$ is connected in parallel with resistor $R_7$ and poled in a direction so as to provide a rapid discharge path for capacitor $C_3$ whenever the potential drops at emitter 403 of transistor $TR_2$.

The operation of the sync latch and its reset delay circuit will now be described. When the brush makes contact with a nonconducting segment, the potential at input lead 401 is approximately ten volts. Sync latch is also in its OFF condition which means that transistor $TR_5$ is conducting while transistor $TR_4$ is nonconducting. In the transition from a nonconducting segment to a conducting segment, the potential of emitter 302 in FIGURE 3 drops to a point close to ground, which thereupon directs a negative pulse through diode $CR_4$ and capacitor $C_5$ to base 410 of transistor $TR_4$. This causes base 410 to drop below the potential of emitter 408 so as to render transistor $TR_4$ conducting. Current flow in collector 409 now causes its potential to rise so as to transmit a positive pulse through capacitor $C_6$ in order to raise base 413 of transistor $TR_5$ above the potential of emitter 411. This causes transistor $TR_5$ to cease conducting which thus drops its collector potential to ground. Since there is now a voltage drop of 20 volts across the voltage divider circuit connected to base 410 of transistor $TR_4$, said base is maintained at a potential lower than that of its emitter 408 so as to continue conduction therethrough. However, since the potential of collector 409 is now higher than ground, the potential at base 413 of transistor $TR_5$ remains higher than its emitter 411 so as to maintain it in a nonconducting state. The sync latch is now in its ON state and will remain therein until a negative reset pulse arrives at base 413 of $TR_5$.

During the time that transistor $TR_1$ in FIGURE 3 is conducting heavily, the potential on lead 401 is close to ground so as to render $TR_2$ heavily conducting. This drops the potential at emitter 403 below the firing voltage of transistor $TR_3$. However, when brush noise is present, or upon transition of the brush from a conducting segment to a nonconducting segment, the voltage at lead 401 again rises which renders transistor $TR_2$ less conducting and thus raises the potential at its emitter 403. Since capacitor $C_3$ charges through resistor $R_7$, however, a certain time delay will occur before its potential can possibly reach the firing voltage of transistor $TR_3$. Upon reaching this firing potential, a drop in potential is produced at point B which is coupled through diode $CR_5$ and capacitor $C_7$ to base 413 of transistor $TR_5$. This negative pulse switches on transistor $TR_5$ which thus causes transistor $TR_4$ to be turned off. Capacitor $C_3$ also discharges through transistor $TR_3$ which eventually ceases conduction when the potential at its base 406 reaches an extinguishing value. Since diode $CR_3$ has its cathode connected to collector 409 of transistor $TR_4$, it is seen that emitter 405 of transistor $TR_3$ cannot thereafter rise to its firing potential since collector 409 is at ground potential when the sync latch is in its OFF condition.

The reset delay circuit is required so as to prevent erroneous reset of the sync latch in case any noise pulses of sufficient magnitude are detected by the brush while on the conducting segment. In other words, it is desired to reset the sync latch only when a transition is made from a conducting segment to a nonconducting segment. However, each such noise pulse causes the potential at emitter 403 to momentarily rise and so begin charging $C_3$. Diode $CR_2$ is poled so as to bypass resistor $R_7$ and allow the rapid discharge of capacitor $C_3$ when emitter 403 falls again so as to completely remove any charge which might be built up from these noise pulses. Otherwise, a quick succession of noise pulses might cause an accumulation of charge which eventually would reach the firing potential of $TR_3$ and thus cause the reset of the sync latch while the brush is on the conductive segment. In such case, the sync latch might well be set again to its ON condition more than once during each conducting segment.

Figure 5:
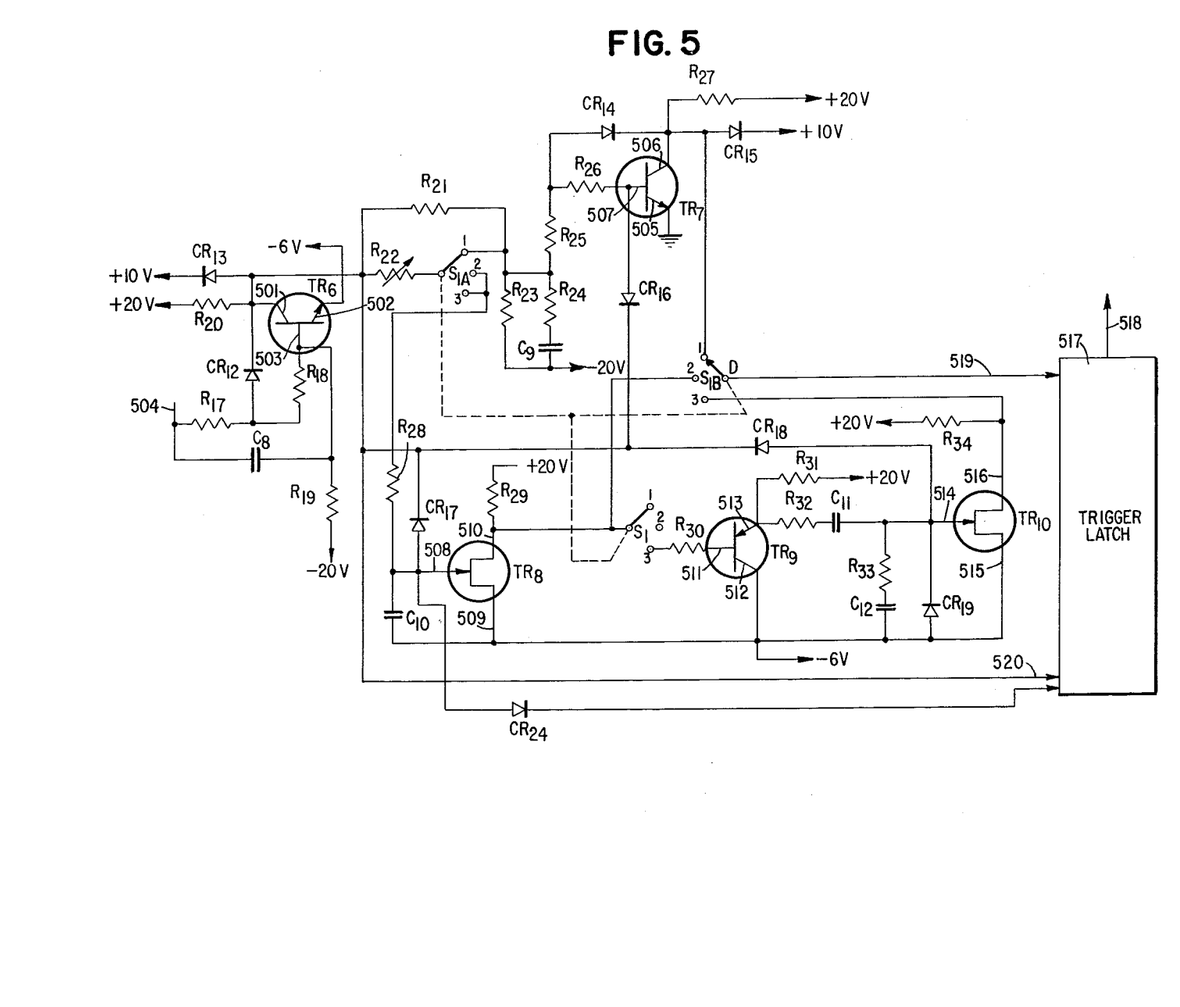
FIGURE 5 shows the details of the relay generator.

Referring now to FIGURE 5, the circuit of delay generator 209 of FIGURE 2 will now be described. Interrogation delays of from 0.2 microsecond to 4 seconds are provided therein in three continuous ranges as selected by variable resistor $R_{22}$ and switches $S_1$, $S_{1A}$, and $S_{1B}$. Switches $S_1$, $S_{1A}$, and $S_{1B}$ are mechanically ganged together, and provide the coarse delay adjustment. Up to 500 microseconds delay is available when these switches are in their first position, while delays of 500 microseconds to 40 milliseconds are available when they are in their second position. Delays up to 4 seconds may be obtained when they are in their third position. Resistor $R_{22}$ provides the fine delay adjustment within each of these three ranges.

$TR_6$ is an N-P-N transistor having its base 503 coupled between resistors $R_{18}$ and $R_{19}$ of a voltage divider comprising resistors $R_{17}$, $R_{18}$, and $R_{19}$ in series. One terminal of the voltage divider is connected to input lead 504 which is coupled to output lead 415 of the sync latch in FIGURE 4. The other terminal of this voltage divider is coupled to a $-20$ volt potential. Speedup capacitor $C_8$ is connected across resistors $R_{17}$ and $R_{18}$ so as to speed up the effect of any change in potential at input lead 504. Collector 501 is coupled through load resistor $R_{20}$ to a $+20$ volt terminal and is clamped through diode $CR_{13}$ to a maximum of $+10$ volts. Emitter 502 is coupled to a $-6$ volt terminal. Diode $CR_{12}$ is coupled between collector 501 and one terminal of resistor $R_{17}$ and is poled so as to limit the current flow in collector circuit in order to protect transistor $TR_6$.

The output from collector 501 is coupled to variable resistor $R_{22}$, the other terminal of which is connected to the rotating contact of switch $S_{1A}$. Resistor $R_{21}$ is connected between collector 501 and the "1" contact of switch $S_{1A}$. The purpose of resistor $R_{21}$ is to reduce the effective resistance of $R_{22}$ when switch $S_{1A}$ is in its "1" position so that $R_{22}$ can be manipulated through its entire range. The "1" contact of switch $S_{1A}$ is connected to one terminal of a charging circuit consisting of resistor $R_{24}$ and capacitor $C_9$ whose other terminal is connected to the $-20$ volt terminal. Across the charging circuit is connected resistor $R_{23}$. N-P-N transistor $TR_7$ has its base 507 coupled to one terminal of resistor $R_{24}$ through current limiting resistors $R_{26}$ and $R_{25}$. Furthermore, base 507 is coupled through clamping diode $CR_{16}$ to collector 501 of transistor $TR_6$. Collector 506 is coupled through load resistor $R_{27}$ to the $+20$ volt terminal and is clamped to a maximum of ten volts through diode $CR_{15}$. Emitter 505 is grounded. Protection diode $CR_{14}$ is coupled between one terminal of resistor $R_{26}$ and collector 506 so as to limit the current flow through collector 506.

Contacts "2" and "3" of switch $S_{1A}$ are both connected to a charging circuit consisting of resistor $R_{28}$ and capacitor $C_{10}$. Transistor $TR_8$ is a silicon unijunction transistor, similar to $TR_3$ in FIGURE 4, having its emitter 508 connected to one side of capacitor $C_{10}$ as shown. Furthermore, emitter 508 is connected to collector 501 of transistor $TR_6$ through diode $CR_{17}$ poled in the direction shown. Base 510 is connected through load resistor $R_{29}$ to the $+20$ volt terminal, while the other base 509 is connected to the $-6$ volt terminal. The output of base 510 is connected to the "2" contact of switch $S_{1B}$ and also to the moving contact of switch $S_1$. Contact "3" of switch $S_1$ is connected through base current limiting resistor $R_{30}$ to base 511 of P-N-P transistor $TR_9$. Emitter 513 is connected through load resistor $R_{31}$ to the $+20$ volt terminal, and is also connected to one terminal of resistor $R_{32}$. Collector 512 is connected to the $-6$ volt terminal. Resistor $R_{32}$, capacitor $C_{11}$, resistor $R_{33}$, and capacitor $C_{12}$ are connected in series in this order with the other terminal of capacitor $C_{12}$ being connected to the $-6$ volt terminal. Diode $CR_{19}$ is connected in parallel with resistor $R_{33}$ and capacitor $C_{12}$.

Transistor $TR_9$, together with its above-described resistors, capacitors, and diode, forms a frequency dividing or counting circuit in which increments of charge are periodically transferred from capacitor $C_{11}$ to capacitor $C_{12}$ in order to gradually increase the potential at the emitter 514 of transistor $TR_{10}$. $TR_{10}$ is a silicon unijunction transistor having its emitter 514 connected between capacitor $C_{11}$ and resistor $R_{33}$. Furthermore, clamping diode $CR_{18}$ is connected between emitter 514 and collector 501 of transistor $TR_6$. Base 516 is connected through load resistor $R_{34}$ to the $+20$ volt terminal and is further connected to contact "3" of switch $S_{1B}$. The moving contact of switch $S_{1B}$ is connected to output lead 519 which is directed to trigger latch 517. This trigger latch 517 is identical to the sync latch shown in FIGURE 4. Lead 519 is connected to an input corresponding to input 401 in FIGURE 4. Collector 501 of transistor $TR_6$ is also connected to output lead 520 which in turn is connected to the cathode of a diode corresponding to $CR_5$ in FIGURE 4 so as to reset trigger latch 517 to its OFF condition when the potential drops at collector 501. Diode $CR_{24}$ is connected between emitter 508 of transistor $TR_8$ and the collector of a transistor in trigger latch 517 which is nonconducting when the latch is set to its ON condition. Such a transistor corresponds to transistor $TR_5$ in the sync latch whose collector stands at ground potential when the sync latch is in ON condition. The purpose of diode $CR_{24}$ is to prevent a firing potential from being impressed on emitter 508 while latch 517 is ON.

The operation of FIGURE 5 will now be described, with particular reference to the waveforms at points D and E shown in FIGURE 7. When a brush is contacting a nonconducting segment, the sync latch of FIGURE 4 will be in its OFF condition so that output lead 416 is raised substantially above ground potential. In such case, base 503 of transistor $TR_6$ is at a potential so as to cause it to heavily conduct. Therefore, the potential of collector 501 is quite low due to the current flow through resistor $R_{20}$. This low potential of collector 501 is transmitted through diode $CR_{16}$ to base 507 of transistor $TR_7$ so as to prevent current flow therethrough. Collector 506, however, is clamped at $+10$ volts and cannot rise above this value. If it is assumed at this time that switches $S_{1A}$ and $S_{1B}$ are in their "1" positions, then this 10 volt potential is applied to trigger latch 517 via lead 519. Upon the sync latch being set to its ON condition by the brush transition, the potential at lead 504 will drop to approximately ground so as to reduce the current flow in collecor circuit 501 of transistor $TR_6$. The potential at collector 501 thereby increases to its maximum of 10 volts. Still assuming that switch $S_{1A}$ is on contact "1," capacitor $C_9$ is charged through resistor $R_{24}$ which is serially connected to the parallel combination of resistors $R_{21}$ and $R_{22}$. Depending upon the particular setting of resistor $R_{22}$, the potential at base 507 of transistor $TR_7$ will rise so that it will be turned ON at some time delayed from the appearance of $+10$ volts on collector 501 of $TR_6$. The drop in potential at collector 506 is sent to trigger latch 517 so as to set it to its ON condition. As mentioned before, with this setting of switches $S_{1A}$ and $S_{1B}$, resistor $R_{22}$ can be varied so as to provide delays up to 500 microseconds.

Now assuming that switches $S_{1A}$ and $S_{1B}$ are resting on their "2" contacts, it is seen that capacitor $C_{10}$ is instead charged through resistors $R_{28}$ and $R_{22}$ when the potential at collector 501 increases. It should be noted that while $TR_6$ is heavily conducting, emitter 508 of transistor $TR_8$ is kept at low potential through diode $CR_{17}$. However, upon the potential at collector 501 increasing, the firing potential of transistor $TR_8$ is eventually reached at emitter 508 at a time delay dependent upon the setting of resistor $R_{22}$. The value of $R_{28}$ and $C_{10}$, coupled with the fact that $R_{21}$ is no longer in parallel with $R_{22}$, allows the firing of $TR_8$ to be delayed from 500 microseconds to 40 milliseconds. A drop in potential is generated at base 510 which is transmitted through contact "2" of switch $S_{1B}$ so as to set trigger latch 517 to its ON condition. After the trigger latch has been set to its ON condition, diode $CR_{24}$ will clamp emitter 508 at ground potential so as to prevent $TR_8$ from acting as an oscillator due to the continued presence of high potential at collector 501.

If delays of from 40 milliseconds to 4 seconds are desired, the switches are set to their "3" contact. This allows the output from transistor $TR_8$ to be directed to base 511 of transistor $TR_9$ instead of to output line 519. When $TR_8$ is not conducting, base 511 of transistor $TR_9$ is at a potential high enough so as to prevent conduction of transistor $TR_9$. It is now again assumed that the collector potential of transistor $TR_6$ is low due to the fact that the brush is on a nonconducting segment. Therefore, the potential at emitter 514 of transistor $TR_{10}$ is also low since diode $CR_{18}$ clamps it to collector 501. Transistor $TR_{10}$ cannot possibly fire at this time. Also at this time it is noted that the voltage across capacitor $C_{12}$ is small due to the fact that one of its terminals is clamped to the $-6$ volt terminal, while the other terminal is connected through resistor $R_{33}$ to base 514. However, capacitor $C_{11}$ has a large potential thereacross since one terminal is clamped to the $+20$ volt terminal through resistors $R_{31}$ and $R_{32}$, and transistor $TR_9$ is not conducting.

Upon a brush transition from a nonconducting to a conducting segment, the potential in collector 501 increases so as to cause transistor $TR_8$ to fire shortly thereafter, as has been previously described. With the drop in potential at base 510, transistor $TR_9$ becomes conducting so as to drop the potential at emitter 513. Thereupon, capacitors $C_{11}$ and $C_{12}$ begin to discharge since the total voltage potential across them is now reduced due to current flow through $TR_9$ via $R_{31}$. However, diode $CR_{19}$ is poled so as to effectively short circuit the series circuit of $R_{33}$ and $C_{12}$, thus substantially reducing the time constant of the discharge path for $C_{11}$. However, $C_{12}$ must still discharge through $R_{32}$ and $R_{33}$. Therefore, capacitor $C_{11}$ is discharged at a much faster rate than is capacitor $C_{12}$. Eventually, the current flow through $TR_8$ is extinguished which raises the base potential of transistor $TR_9$ so as to turn it OFF. Capacitors $C_{11}$ and $C_{12}$ now begin to charge at the same rate due to the rise in potential across them. Diode $CR_{19}$ is now reverse biased and a charging path is completed from the $+20$ volt terminal through $R_{31}$, $R_{32}$, $C_{11}$, $R_{33}$, and $C_{12}$. The values of these resistors and capacitors are so proportioned that a greater charge is placed back onto capacitor $C_{12}$ during the duration of this charging time than was lost during the discharge time. Therefore, the potential on emitter 514 is incrementally increased.

Transistor $TR_8$ will act as an oscillator as long as the potential at collector 501 is high and as long as trigger latch 517 is OFF. This is because capacitor $C_{10}$ discharges upon the firing of $TR_8$. When $TR_8$ is extinguished, then $C_{10}$ again charges to the firing potential, and so the operation is repeated. Therefore, the above-described charging time of capacitors $C_{11}$ and $C_{12}$ is interrupted by another firing of $TR_8$. The second drop in potential at base 510 will again cause transistor $TR_9$ to conduct, thus causing capacitor $C_{11}$ to discharge rapidly while hardly discharging capacitor $C_{12}$ at all. Upon cessation of conduction through $TR_8$, another incremental charge will be added to capacitor $C_{12}$. Thus, with each input pulse from $TR_8$ to the base of transistor $TR_9$, there will be in incremental increase of potential at emitter 514 of transistor $TR_{10}$ which will eventually result in its firing potential being reached. After a certain number of pulses from $TR_8$, transistor $TR_{10}$ will therefore fire and cause a drop in potential to appear on output lead 519 which will set trigger 517 to its ON condition. $C_{12}$ discharges through $TR_{10}$ but cannot thereafter charge again to the firing potential since transistor $TR_8$ is no longer operating due to clamping diode $CR_{24}$.

When transistor $TR_9$ is returned to its heavily conducting state because of a brush transition from a conducting to a nonconducting segment, the drop in potential at collector 501 resets trigger latch 517 to its OFF condition.

Trigger latch 517, when set on its ON condition provides a positive pulse on output lead 518 for triggering the interrogation pulse generator 210 shown in block form in FIGURE 2. Such a generator may be similar to the Tektronix Pulse Generator, type 163, which provides a positive output pulse of adjustable width. This adjustable width interrogation signal is fed, among other places, to inverter 211 of FIGURE 2, which is shown in greater detail, along with AND circuit 212, in FIGURE 6.

Figure 6:
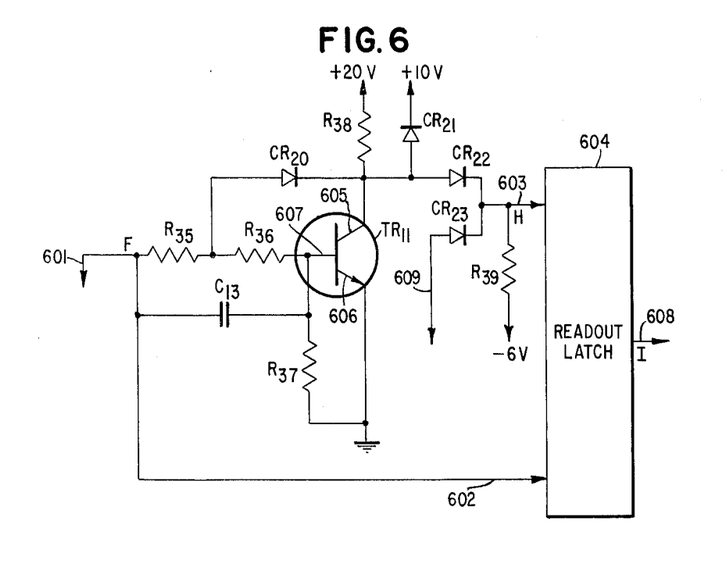
FIGURE 6 shows the gating and readout circuitry.

In FIGURE 6, the positive interrogation signal from the interrogation pulse generator is applied at input lead 601. A voltage divider network consisting of resistors $R_{35}$, $R_{36}$, and $R_{37}$ is connected between lead 601 and ground, together with speedup capacitor $C_{13}$ connected across resistors $R_{35}$ and $R_{36}$. Base 607 of N-P-N transistor $TR_{11}$ is connected to one terminal of resistor $R_{36}$. Its emitter 606 is grounded. Collector 605 is coupled to the $+20$ volt terminal through load resistor $R_{38}$. Diode $CR_{20}$ is coupled between collector 605 and a point on the voltage divider so as to limit collector current. Collector 605 is also clamped to a maximum $+10$ volt potential through diode $CR_{21}$. $TR_{11}$ therefore inverts the signal applied at 601.

Diodes $CR_{22}$ and $CR_{23}$, coupled with resistor $R_{39}$, are used as a negative AND gate. The input to diode $CR_{22}$ is coupled to collector 605, while the input to diode $CR_{23}$ is coupled to input lead 609. Input lead 609 is connected to output lead 305 in FIGURE 3. The ouput 603 of this AND gate, corresponding to unit 212 in FIGURE 2, is directed to the set input of the readout latch 213 whose construction is identical with the sync latch shown in FIGURE 4. Lead 601 is also coupled to the reset input of readout latch 213 via lead 602. Resistor $R_{39}$ is coupled to the $-6$ volt terminal. The circuit parameters of readout latch 213 are so chosen that a signal appearing on its set lead 603 must be within 30 percent of its down level, for at least 0.5 microsecond, in order to set it to its ON condition. However, if a different latch sensitivity is desired, the simple addition of a divider network to the set input allows the readout latch 213 to change state for any particular level of input signal. Once readout latch 213 has been set to its ON condition, it will remain in this state until it is reset to its OFF condition by the trailing edge of the interrogation signal.

The operation of FIGURE 6 will now be described with particular reference to the waveforms at points F, G, H, and I. In the absence of a pulse from interrogation pulse generator 210, the potential of lead 601 will be down so as to cause little or no conduction through transistor $TR_{11}$. Therefore, the potential at collector 605 is at its maximum 10 volts which is transferred through diode $CR_{22}$ and appears on the set lead 603. When the interrogation signal appears at input 601, and for the duration thereof, base 607 of transistor $TR_{11}$ is increased in potential so as to initiate a heavy conduction therethrough. Therefore, the potential of collector 605 decreases. If the output of transistor $TR_1$ in FIGURE 3 is also down at any time during the presence of the interrogation signal, then the potential of lead 603 will also be down, since the potential at point H follows the higher of the two voltages applied at the inputs of diodes $CR_{22}$ and $CR_{23}$. However, readout latch 213 will not be set to its ON condition unless the signal on lead 603 is within 30 percent of the down level for at least 0.5 microsecond as before described. Since the input to diode $CR_{23}$ is derived from the converter brush output by way of transistor $TR_1$, it is seen that the signal at point H will essentially follow the converter brush output during the interrogation time. An interrogation is therefore not considered successful until the converter brush signal is at a certain level for a certain length of time. In other words, contact noise must be below a certain minimum in order that the readout circuitry can detect the binary "1" indication of a brush when on a conducting segment.

The leading edge of the ON signal from readout latch 214 is applied via lead 608 to counter 214 in FIGURE 2 in order to record the number of successful interrogations. Latch 213 can only be turned on once, if at all, during each interrogation signal time. As noted previously, counter 215 in FIGURE 2 counts the number of total interrogations as determined from the number of interrogation pulses supplied by generator 210. Suitable counters for this purpose may be the Berkely Universal Eput and Timer Model 7360C. After a certain predetermined count in counter 215, an output therefrom may be used to prevent the further addition of pulses to counter 214 so as to directly indicate the percent of successful interrogations.

The following values for the components shown in FIGURES 3 to 6 are exemplary of a preferred embodiment. However, they are not to be construed as limiting the invention to the particular values indicated in the following table. All resistances are in terms of ohms.

| | | | |
|---|---|---|---|
| $R_1$ | 2K | $R_{21}$ | 51K |
| $R_2$ | 0–20K | $R_{22}$ | 250K |
| $R_3$ | 1K | $R_{23}$ | 100K |
| $R_4$ | 1K | $R_{24}$ | 5.1K |
| $R_5$ | 1K | $R_{25}$ | 5.1K |
| $R_6$ | 2K | $R_{26}$ | 510 |
| $R_7$ | 250K | $R_{27}$ | 5.6K |
| $R_8$ | 1K | $R_{28}$ | 2K |
| $R_9$ | 20K | $R_{29}$ | 2K |
| $R_{10}$ | 470 | $R_{30}$ | 1K |
| $R_{11}$ | 7.5K | $R_{31}$ | 2K |
| $R_{12}$ | 7.5K | $R_{32}$ | 400 |
| $R_{13}$ | 470 | $R_{33}$ | 5.1K |
| $R_{14}$ | 20K | $R_{34}$ | 2K |
| $R_{15}$ | 5.6K | $R_{35}$ | 22K |
| $R_{16}$ | 5.6K | $R_{36}$ | 2.2K |
| $R_{17}$ | 10K | $R_{37}$ | 5.1K |
| $R_{18}$ | 1K | $R_{38}$ | 2K |
| $R_{19}$ | 15K | $R_{39}$ | 7.5K |
| $R_{20}$ | 2K | | |

| | | | |
|---|---|---|---|
| $C_1$ | mmf. 390 | $C_8$ | mmf. 330 |
| $C_2$ | mmf. 390 | $C_9$ | mf. .01 |
| $C_3$ | mf. .05 | $C_{10}$ | mf. .25 |
| $C_4$ | mmf. 51 | $C_{11}$ | mf. .1 |
| $C_5$ | mmf. 100 | $C_{12}$ | mf. .5 |
| $C_6$ | mmf. 51 | $C_{13}$ | mmf. 100 |
| $C_7$ | mmf. 100 | | |

In the above preferred embodiment, transistors $TR_1$, $TR_2$, $TR_4$, $TR_5$ and $TR_9$ may be of the type known as 2N123. Transistors $TR_3$, $TR_8$, and $TR_{10}$ may be of the type known as 2N490. Transistors $TR_6$, $TR_7$, and $TR_{11}$ may be of the type known as IBM 51. Diodes $CR_1$ through $CR_{23}$ may be of the type known as 1N191.

Although the invention has been described with reference to a preferred embodiment, it will be understood that many modifications and changes therein will occur to those skilled in the art without departing from the spirit of the invention. Accordingly, the scope of the invention is not intended to be limited except as defined by the following claims.

What is claimed is:
1. Apparatus for analyzing contact noise in brush encoders, said encoders having conducting and non-conducting segments, said noise being produced, if at all, during brush contact with said conducting segments, which includes means for producing a step signal function having first and second levels, representative respectively of conducting and non-conducting segments of said encoders, a first latch set to a first condition in response to said first level and reset to a second condition in response to said second level, means responsive to said first condition of said first latch for producing a delayed signal, means responsive to said delayed signal for generating an interrogation signal of variable duration, means responsive to said first level together with said interrogation signal for producing an output signal representative of said first level during the period of said interrogation signal, means to compare said output signal with a predetermined standard, means to count the number of signals meeting said standard to obtain a first count, means to obtain a second count indicative of said interrogation signals responsible for said output signals and means to compare said first and second signals to provide said analysis.

2. Apparatus for analyzing a step function having first and second levels which includes first means being set to a first condition in response to each change in said step signal function from said second level to said first level, second means responsive to said first condition for generating an interrogation signal a predetermined time after said change, third means responsive to said first level together with said interrogating signal for producing an output signal representative of said first level during the period of said interrogation signal, means to compare said output signal with a predetermined standard, means to count the number of output signals meeting said standard to obtain the first count, means to obtain the second count indicative of said interrogation signals responsible for said output signals and means to compare said first and second counts to provide said analysis.

References Cited by the Examiner

UNITED STATES PATENTS

| | | | |
|---|---|---|---|
| 2,418,424 | 4/1947 | Plym | 324—28 |
| 2,432,944 | 12/1947 | Shillington | 324—28 |
| 2,828,465 | 3/1958 | Morton | 324—28 |
| 2,857,531 | 10/1958 | Altieri | 324—63 |
| 2,877,413 | 3/1959 | Mueblner | 324—68 |
| 2,904,752 | 9/1959 | Perzley | 324—68 |
| 2,939,075 | 5/1960 | Schwab | 324—57 |

WALTER L. CARLSON, *Primary Examiner.*

SAMUEL BERNSTEIN, *Examiner.*

G. L. LETT, *Assistant Examiner.*